United States Patent [19]

Lindström

[11] Patent Number: 4,618,272
[45] Date of Patent: Oct. 21, 1986

[54] DEVICE FOR FIXING A THRUST BEARING

[75] Inventor: Paul Lindström, Norrköping, Sweden

[73] Assignee: Stal Refrigeration AB, Norrköping, Sweden

[21] Appl. No.: 819,010

[22] Filed: Jan. 16, 1986

Related U.S. Application Data

[63] Continuation of Ser. No. 664,417, Oct. 24, 1984, abandoned.

[30] Foreign Application Priority Data

Oct. 26, 1983 [SE] Sweden .................. 8305875

[51] Int. Cl.$^4$ .................. F16C 23/06; F16C 25/06; F16D 3/00; F16B 39/10
[52] U.S. Cl. .................. 384/517; 384/519; 384/616; 403/98; 403/320; 411/116
[58] Field of Search .............. 411/116, 119, 120, 123, 411/124; 403/98, 320; 384/517, 518, 519, 535, 563, 583, 581, 616, 620, 537

[56] References Cited

U.S. PATENT DOCUMENTS

| | | | |
|---|---|---|---|
| 2,373,859 | 4/1945 | Teaf | 384/519 |
| 2,424,013 | 7/1947 | Bechler | 384/519 |
| 2,540,767 | 2/1951 | Tabbert | 384/519 X |
| 3,905,661 | 9/1975 | Orr | 384/563 |
| 3,934,957 | 1/1976 | Derner | 384/563 |
| 4,173,376 | 11/1979 | Standing et al. | 384/519 X |
| 4,227,755 | 10/1980 | Lundberg | 384/518 |

Primary Examiner—Stuart S. Levy
Assistant Examiner—David Werner
Attorney, Agent, or Firm—Watson, Cole, Grindle & Watson

[57] ABSTRACT

A device for fixing a shaft journalled in a roller bearing, in an axial direction of the shaft, comprising a resilient element which presses the bearing against a supporting surface of a bearing housing and provides a measure of radial adjustment of the shaft in the housing. The fixing device also includes a screw-threaded member, which in its screwed-in position limits axial movement of the roller bearing.

7 Claims, 2 Drawing Figures

DEVICE FOR FIXING A THRUST BEARING

This application is a continuation of application Ser. No. 664,417, filed Oct. 24, 1984, now abandoned.

BACKGROUND OF THE INVENTION

1. Field of the Invention

The present invention relates to a device for fixing a rotatable shaft in its axial direction within a bearing housing. The shaft is journalled in its axial direction, in a roller or ball bearing (hereafter, for convenience, referred to as a "roller bearing"), which is fixed to the shaft and bears against a fixed supporting surface in the housing with a force determined by a resilient element within the housing, the roller bearing thus having a measure of radial movability within the housing.

2. Description of the Prior Art

A device of the above-described kind is disclosed in U.S. Pat. No. 4,227,755 and is primarily intended for fixing the rotor shafts in a rotary compressor. It was previously known to maintain the roller bearing pressed against the supporting surface by means of an annular element which was screwed to the outer ring of the roller bearing. However, such an element must be tightened to just the right amount within the outer ring, and in practice this has proved difficult to achieve. Thus, if the contact between the annular element and the roller bearing was made to be too tight, the radial movability of the bearing was reduced (or even prevented), whereby the roller bearing was forced to take up radial forces as well as axial forces, which had an adverse effect on the life of the bearing. On the other hand, if the annular element was not screwed up tightly enough against the outer ring, the outer ring of the bearing could rotate relative to the supporting surface and the annular element, which may result in wear occurring further loosening the engagement and risking further damage. By arranging a resilient element, for example in the form of a spacing sleeve and a spring, which maintains the roller bearing pressed against the supporting surface with a specified force, as was proposed in the abovementioned patent, the problem of proper fixing of the roller bearing within its housing appeared to be solved. However, it has proved to be difficult to adjust the compressive force of the resilient element, so that, on the one hand, the roller bearing has the desired radial movability, while, on the other hand, the roller bearing, in operation of the machine, is able to absorb a sufficient axial force.

SUMMARY OF THE INVENTION

According to the invention, the above-mentioned problem is solved by means of a screw-threaded fixing member, which is movable in the direction of the axis of the shaft by being screwed into a threaded opening in an element which is fixed relative to the housing, the fixing member in its screwed-in position thereby serving to restrict the axial movement of the roller bearing within the housing.

It is convenient to arrange a spacing sleeve between the screw-threaded fixing member and the roller bearing, and optionally also a gasketed plug between the fixing member and the spacing sleeve.

In a preferred embodiment of device, the end of the screw-threaded fixing member which is most remote from the roller bearing is formed as a pin, the cross-section of which does not conform to that of any readily available tightening tool so that it is likely to be tightened only to the degree possible with finger force.

BRIEF DESCRIPTION OF THE DRAWING

The invention will now be further described in greater detail, by way of example, with reference to the accompanying drawing, wherein.

DESCRIPTION OF THE PREFERRED EMBODIMENT

Figure 1:
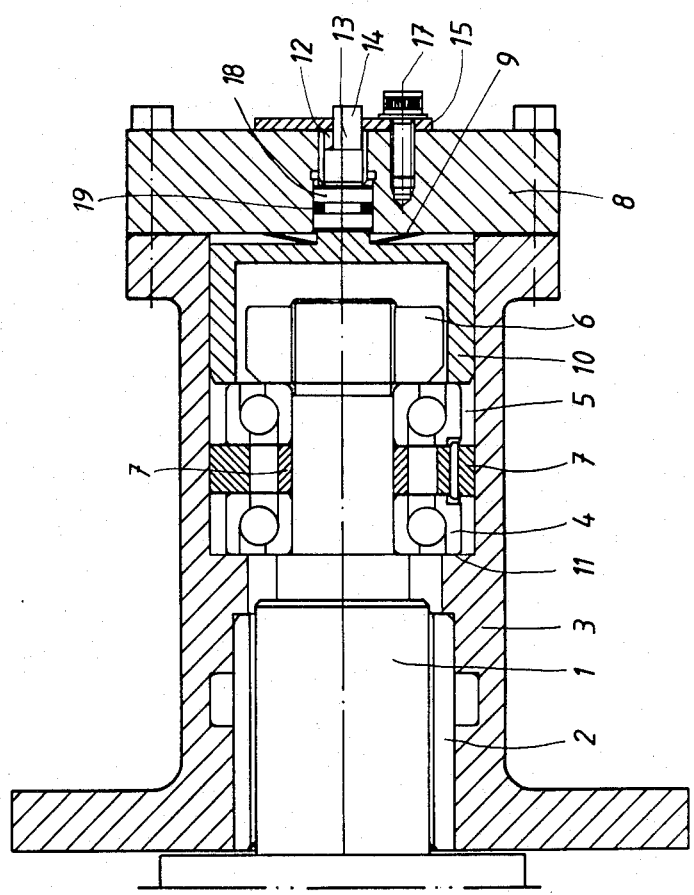
FIG. 1 is a longitudinal section through part of a rotary machine which is provided with a short fixing device according to the invention.

In FIG. 1, 1 designates a rotatable shaft which is journalled in a radial bearing 2 mounted in a bearing housing 3. The shaft 1 is axially journalled in two roller thrust bearings 4, 5 which are mounted on the shaft 1 by means of a locking nut 6. The thrust bearings 4, 5 are separated by annular spacers 7. A cover plate 8 presses a generally cup-shaped spacing sleeve 10 against the thrust bearing 5 by means of a cup spring 9, so that the thrust bearing 4 engages an annular supporting surface 11 formed inside the housing 3.

Figure 2:
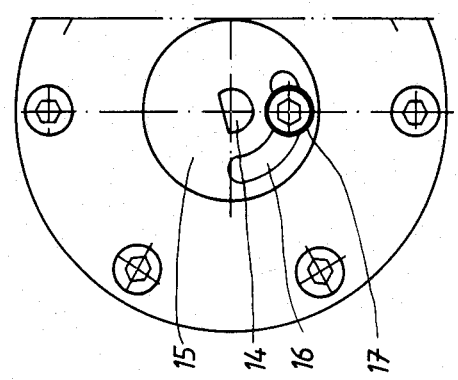
FIG. 2 shows an end view of the fixing device of FIG. 1.

In a screw-threaded opening 12 in the cover plate 8 there is screwed a fixing member in the form of a threaded pin 13. The free end 14 of the pin 13 has a semicircular cross-section (shown in FIG. 2) that is not adapted to engage with any of the conventional range of tightening tools. The free end 14 projects beyond the cover plate 8, and is non-rotatably attached to a locking disc 15, which is provided with an arcuate slot 16 whereby it is lockable by means of a conventional socket-headed screw 17. Between the pin 13 and the spacing sleeve 10, a spacing plug 18 is located. As shown, the plug 18 is provided with a gasket 19, but this is not essential.

The device operates as follows:

The cover plate 8 is fixed in place to close the housing 3 after the locking nut 6 has been lightly applied to the shaft 1 to hold the roller bearings 4, 5 in place. The cup spring 9 then takes over from the nut 6 and generates the required axially directed operating force needed to urge the bearing 4 against the annular supporting surface 11. This operating force is relatively small and is generated by a pressing the open end of the spacing sleeve 10 against the thrust bearing 5. The operating force is large enough to eliminate axial play between the bearing parts but not so large as to prevent movement of the roller bearings 4, 5 within the housing 3 in the radial direction of the shaft 1. The free end 14 of the fixing member 13 is now turned slightly through part of a full turn (e.g., using the fingers on the perimeter of the disc 15) to lightly bring the member 13 into contact with the plug 18, and the plug 18 into contact with the spacing sleeve 10. Thus, axial forces which are greater than those which can be absorbed by the cup spring 9 can now be absorbed by the fixing member, i.e. the pin 13. The locking disc 15 is secured in its finger-tightened position by the screw 17.

It will be appreciated that many modifications are possible to the device illustrated within the ambit of the following claims and all such modifications should be understood to be within the spirit and scope of the invention.

What is claimed is:

1. A machine which includes a rotatable shaft that has a roller bearing positioned around one end thereof, said rotatable shaft defining a central axis therethrough; a housing in which said roller bearing is rotatably positioned, said housing including a support surface against which said roller bearing can be positioned and an open end which lies along said central axis; a cover plate which is mounted on said housing to cover said open end thereof, said cover plate including a threaded hole which extends therethrough in parallel with said central axis; a generally cup-shaped spacing sleeve positioned within said housing between said cover plate and said roller bearing, said generally cup-shaped spacing sleeve having an open end which faces said roller bearing; a threaded fixing member which is engaged in said threaded hole in said cover plate and is capable of moving said generally cup-shaped spacing sleeve towards said roller bearing so as to restrict the movement of said roller bearing within said housing in parallel with said central axis, said threaded fixing member including an inner end which faces said generally cup-shaped spacing sleeve and an outer end which is located externally of said cover plate; and a resilient member located within said housing between said cover plate and said generally cup-shaped spacing sleeve to bias said generally cup-shaped spacing sleeve towards said roller bearing and thus move said roller bearing against said support surface yet allow movement of said roller bearing within said housing transversely to said central axis.

2. The machine as defined in claim 1, wherein two roller bearings are mounted around said one end of said rotatable shaft between said support surface of said housing and said generally cup-shaped spacing sleeve.

3. The machine as defined in claim 1, wherein said resilient member comprises a cup spring.

4. The machine as defined in claim 1, wherein said outer end of said threaded fixing member has a semi-circular cross section.

5. The machine as defined in claim 4, wherein said cover plate has an inner surface which faces said roller bearing and an outer surface which faces away from said bearing, wherein said machine includes a rotatable disc located adjacent said outer surface of said cover plate, said rotatable disc including a semi-circular hole in which said outer end of said threaded fixing member being operatively is fixed.

6. The machine as defined in claim 5, wherein said disc includes an arcuate slot therein radially outwardly of said semi-circular hole, and wherein said machine includes a locking screw which extends through said arcuate slot and into said cover plate.

7. The machine as defined in claim 1, including a gasketed plug positioned between said inner end of said threaded fixing member and said spacing sleeve.

* * * * *